United States Patent [19]

Kimura

[11] Patent Number: 5,226,090
[45] Date of Patent: Jul. 6, 1993

[54] VOICE-OPERATED REMOTE CONTROL SYSTEM

[75] Inventor: Toshiyuki Kimura, Kawagoe, Japan

[73] Assignee: Pioneer Electronic Corporation, Tokyo, Japan

[21] Appl. No.: 578,714

[22] Filed: Sep. 7, 1990

[30] Foreign Application Priority Data

Dec. 29, 1989 [JP] Japan .................................. 1-341622
Dec. 29, 1989 [JP] Japan .................................. 1-341623

[51] Int. Cl.$^5$ .............................................. H03G 3/20
[52] U.S. Cl. ................................... 381/110; 358/194.1
[58] Field of Search ....................... 381/110; 358/194.1

[56] References Cited

U.S. PATENT DOCUMENTS

| | | | |
|---|---|---|---|
| 4,506,377 | 3/1985 | Kishi et al. ........................... | 381/110 |
| 4,725,956 | 2/1988 | Jenkins ................................ | 381/110 |
| 4,926,484 | 5/1990 | Nakano ................................ | 381/110 |
| 4,933,963 | 6/1990 | Sato et al. ............................ | 379/58 |

*Primary Examiner*—Forester W. Isen
*Attorney, Agent, or Firm*—Sughrue, Mion, Zinn, Macpeak & Seas

[57] ABSTRACT

A voice-operated remote control system which transmits a remote control signal in response to a voice command has a detector for detecting whether a voice command is received or not. A detected signal from the detector is applied to a power supply control circuit. When there is no voice command received as detected by the detector, the power supply control circuit cuts off electric energy supplied to a speech recognition circuit which consumes the largest amount of electric energy in the voice-operated remote control system. The voice-operated remote control system also has a continuous operation instructing unit which produces an instruction signal that instructs a repetition command to cause a remotely controlled device to repeat an operation. The instruction signal is supplied to a continuous operation control unit which adds the repetition command to the remote control signal that is transmitted to the remotely controlled device.

6 Claims, 10 Drawing Sheets

VOICE-OPERATED REMOTE CONTROL SYSTEM

BACKGROUND OF THE INVENTION

The present invention relates to a remote control system for remotely controlling various electronic devices, and more particularly to a remote control system for remotely controlling devices such as AV (audio visual) devices by way of voice commands.

In recent years, various AV devices such as stereo sets, television receivers, cassette tape decks, video tape decks, compact disk players, laser vision disk players, or the like are equipped with remote control systems.

A remote control system has a transmitter which is usually positioned remotely from a controlled AV device. The transmitter, when operated, transmits a remote control signal, such as an infrared remote control signal, which is received by a receiver in the controlled AV device. The received remote control signal is decoded to control the AV device as intended by the remote control signal.

There has recently been developed a voice-operated remote control system which employs voice control commands instead of control commands entered through keys. The voice-operated remote control system has a microphone mounted on a transmitter for converting a voice command into an electric voice signal, and a speech recognition LSI (Large Scale Integration) circuit for generating a remote control signal which corresponds to a voice pattern represented by the voice signal. The remote control signal thus generated is transmitted to a receiver in a controlled AV device.

In the transmitter of the voice-operated remote control system, a power supply circuit supplies electric energy to the speech recognition LSI circuit, a controller, and other components. In order to process voice commands which may be applied all of a sudden, the speech recognition LSI circuit is normally kept in a standby condition, i.e., remains energized at all times.

If the speech recognition LSI circuit remains energized at all times, then it can also receive other voices than the voices of the operator. As a result, while the AV device is being operated to reproduce recorded sounds, voice signals contained in the reproduced sounds may be entered through the microphone, and the input voice signals may be recognized in error as voice commands, causing an erroneous operation of the AV device.

The speech recognition LSI circuit has a higher power requirement than the usual remote control LSI circuits. Therefore, if the transmitter is battery-powered, it may easily malfunction due to a quick voltage drop resulting from the power consumption by the speech recognition LSI circuit.

A transmitter which incorporates a conventional voice-operated remote control system transmits a remote control signal indicative of a control command only when a voice command is received. When it is desired to repeat one control mode such as for a continuous increase in an audio output power, a voice command for such control mode must be repeated. Such a repeated entry of the same voice command is however inconvenient and tedious.

SUMMARY OF THE INVENTION

It is a first object of the present invention to provide a voice-operated remote control system which has a lower power requirement.

A second object of the present invention is to provide a voice-operated remote control system which is capable of having a controlled device repeat a desired operation with a voice command which is applied once.

According to a first aspect of the present invention, there is provided a voice-operated remote control system comprising a microphone for converting a voice command into an electric signal, speech recognition means for recognizing the voice command based on the electric signal from the microphone and producing command data corresponding to the voice command, transmitting means for generating and transmitting a remote control signal based on the command data, power supply means for supplying electric energy to the speech recognition means and the transmitting means, detecting means for producing a detected signal indication of whether a voice command is received or not, and power supply control means for cutting off the electric energy from the power supply means to at least the speech recognition means in the absence of a voice command as indicated by the detected signal.

The detecting means detects whether there is received a voice command or not, and produces a detected signal. If there is no voice command as indicated by the detected signal, the power supply control means stops the supply of electric energy from the power supply means through power supply wires to at least the speech recognition means which has the greatest power requirement in the remote control system. Therefore, the remote control system is kept in a standby condition in a low power consumption mode. The remote control system is energized to transmit remote control signals only when it is required to do so. As a result, the remote control system is prevented from being triggered into an erroneous operation due to surrounding noise, and also has a low power requirement.

According to a second aspect of the present invention, there is also provided a voice-operated remote control system comprising a microphone for converting a voice command into an electric signal, speech recognition means for recognizing the voice command based on the electric signal from the microphone and producing command data corresponding to the voice command, transmitting means for generating and transmitting a remote control signal based on the command data, power supply means for supplying electric energy to the speech recognition means and the transmitting means, continuous operation instructing means for producing an instruction signal to apply a repetition command to repeat an operation to a remotely controlled device, and continuous operation control means for adding the repetition command to the remote control signal in response to the instruction signal.

The continuous operation instructing means produces an instruction signal to apply a repetition command to repeat a desired operation to the remotely controlled device. Based on the instruction signal, the continuous operation control means adds the repetition command to the remote control signal. Therefore, the remote control system transmits the remote control signal including the repetition command to the remotely controlled device when the voice command is received once. Consequently, the remotely controlled device repeats the same operation.

Since the repetition command which enables the remotely controlled device to repeat the same operation is added to the remote control signal in response to the instruction signal from the continuous operation instructing means, the remotely controlled device can be controlled to repeat the same operation without the operator's having to give the same voice command repeatedly.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE INVENTION

General Remote Control System

For a better understanding of the present invention, a general remote control system and a voice remote control signal will first be described below.

Figure 1:
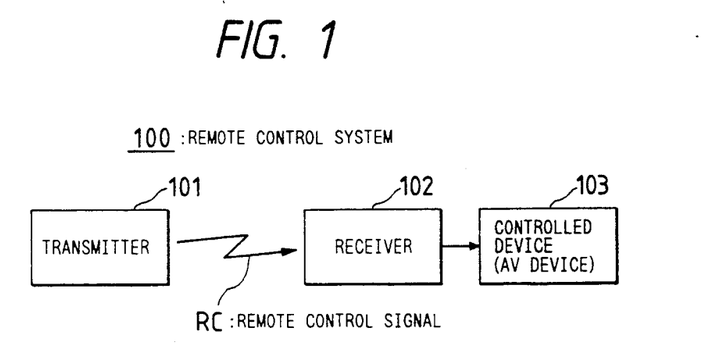
FIG. 1 is a block diagram of a general remote control system.

As shown in FIG. 1, a remote control system 100 comprises a transmitter 101 for transmitting a remote control signal from a position remote from a controlled device 103 such as an AV device, and a receiver 102 for receiving the transmitted remote control signal, decoding the remote control signal, and sending the decoded information to the controlled device 103.

Figure 2:
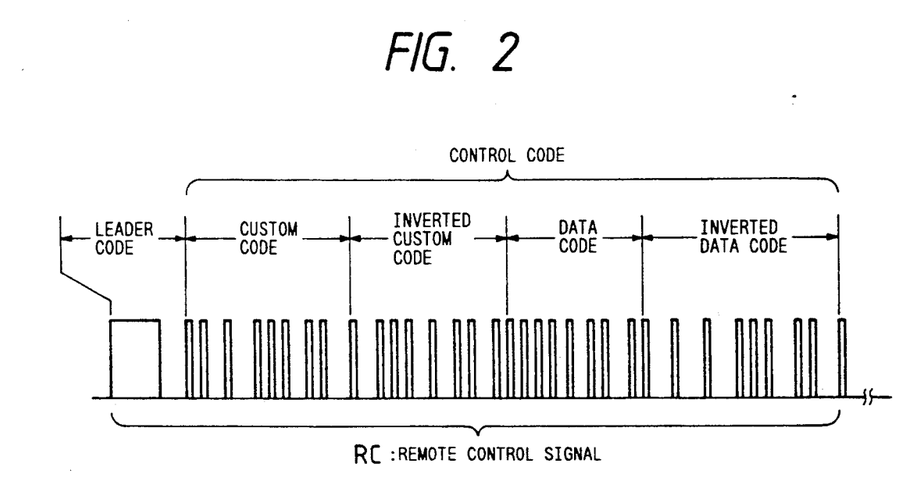
FIG. 2 is a diagram showing a remote control signal by way of example.

FIG. 2 shows a general remote control signal. The remote control signal is composed of a leader code which indicates the transmission of data to a receiver, a custom code and an inverted custom code which indicate a controlled device, a data code and an inverted data code which indicate a control command for the controlled device. The inverted custom code and the inverted data code are used to detect any error in the custom code and the data code, respectively.

Figure 3:
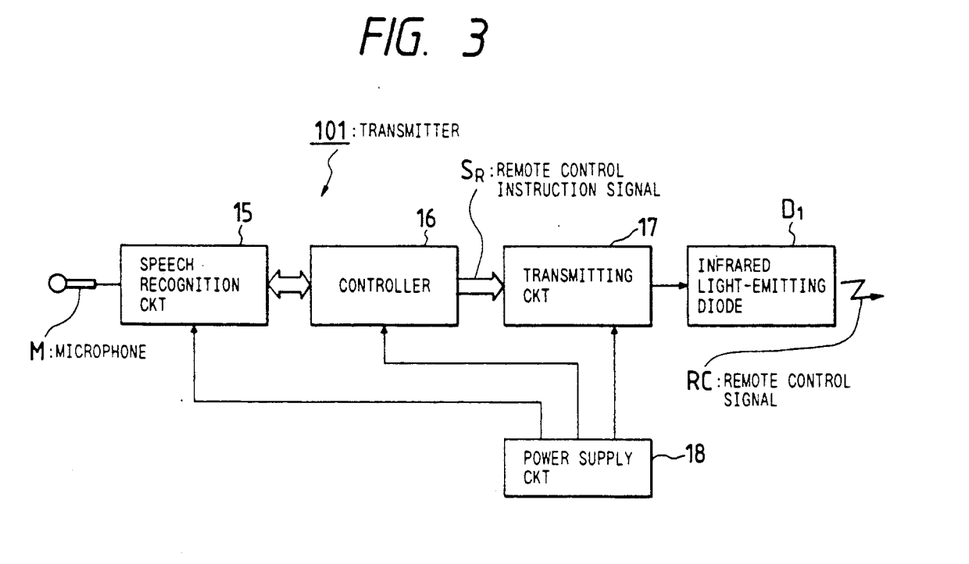
FIG. 3 is a block diagram of the transmitter of a general voice-operated remote control system.

FIG. 3 schematically shows the transmitter 101 of the voice-operated remote control system 100. The transmitter 101 has a microphone M for converting a voice command into an electric signal. The converted electric signal is applied to a speech recognition circuit 15 in the form of a speech recognition LSI circuit or the like which includes a microprocessor. The speech recognition circuit 15 recognizes the contents of the applied electric signal, and produces command data corresponding to the recognized contents. The transmitter 101 also has a controller 16 comprising a microprocessor. Based on the command data from the speech recognition circuit 15, the controller 16 produces and applies a remote control instruction signal SR to a transmitting circuit 17, which then energizes an infrared light-emitting diode D1 to transmit a remote control signal RC. The above components of the transmitter 101 are supplied with electric energy from a power supply circuit 18.

When a voice command is received through the microphone M, the speech recognition circuit 15 converts the voice command into pattern data. The speech recognition circuit 15 compares the voice command pattern data with a plurality of standard pattern data which are stored therein, and determines the distance between the voice command data and the standard pattern data, and outputs command data corresponding to the standard pattern data the distance of which from the voice command pattern data is smallest. There may also be employed another speech recognition process in which the similarity of the compared pattern data is determined according to a simple similarity method and command data corresponding to the standard pattern data which has the highest similarity are outputted. The command data thus produced are applied to the controller 16.

The controller 16 sends a remote control signal SR corresponding to the applied command data to the transmitting circuit 17. In response to the supplied remote control instruction signal SR, the transmitting circuit 17 drives the infrared light-emitting diode D1 to transmit a remote control signal RC. The controlled device 103 is therefore remotely controlled by the remote control signal RC.

During the above operation, the power supply circuit supplies necessary electric energy to the various components of the transmitter 101, such as the speech recognition circuit 15, the controller 16, etc. In order to process a voice command which may be applied all of a sudden, the speech recognition circuit 15 is normally kept in a standby condition, i.e., remains energized at all times.

With the speech recognition circuit 15 energized at all times, however, the transmitter 101 may be triggered into erroneous operation as described above.

First Embodiment

A voice-operated remote control system according to a first embodiment of the present invention will now be described below with reference to FIGS. 4 through 10.

External Structure

Figure 4:
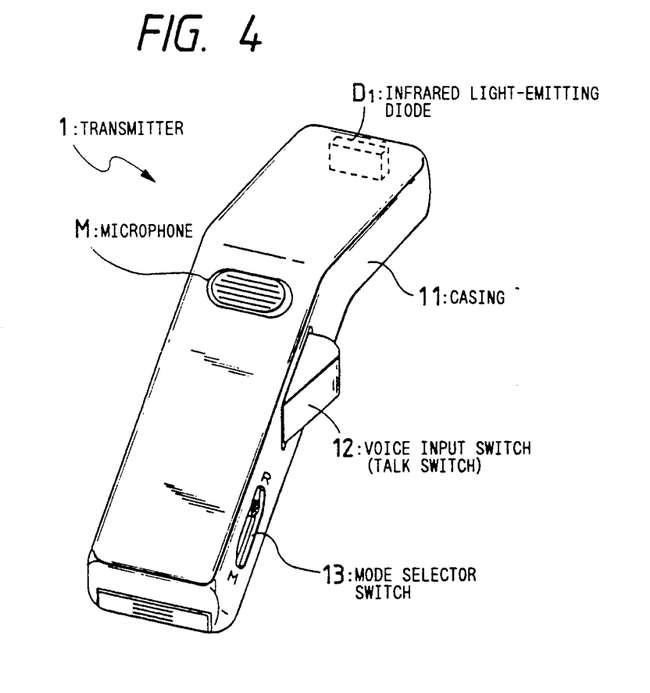
FIG. 4 is a perspective view of the transmitter of a voice-operated remote control system according to a first embodiment of the present invention.

As shown in FIG. 4, a transmitter 1 of the voice-operated remote control system has a casing 11 of an angularly bent configuration which supports a microphone M on one panel. An infrared light-emitting diode D1 for transmitting a remote control signal is mounted in one end of the casing 11. On one side of the casing 11, there are disposed a voice input switch (hereinafter referred to as a "talk switch") 12 which is closed when pressed to enter a voice command, and a mode selector switch 13 for selecting one of a speech recognition mode and a speech registration mode at a time. The casing 11 accommodates therein an electronic circuit of the voice-operated remote control system according to the first embodiment.

Electronic Circuit Structure

Figure 5:
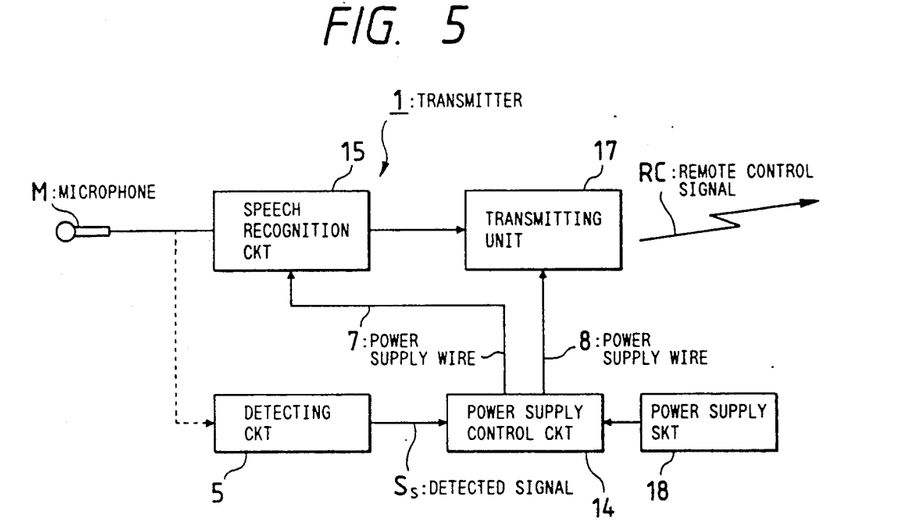
FIG. 5 is a block diagram of the transmitter of the voice-operated remote control system according to the first embodiment.

FIG. 5 shows in block form the electronic circuit of the transmitter 1 of the voice-operated remote control system according to the first embodiment of the present invention. The transmitter 1 has a microphone M for converting a voice command into an electric signal, a speech recognition circuit 15 for recognizing the voice command based on the electric signal from the microphone M and producing command data corresponding to the voice command, a transmitting circuit 17 for generating and transmitting a remote control signal RC based on the command data, and a power supply circuit 18 for supplying electric energy to the various components of the transmitter 1 through power supply wires 7, 8. The transmitter 1 also has a voice command detector circuit 5 for detecting whether there is a voice command or not and for producing a detected signal Ss, and a power supply control circuit 14 for temporarily cutting off the electric energy from the power supply circuit 18 to at least the speech recognition circuit 15 when there is no voice command applied.

Figure 6:
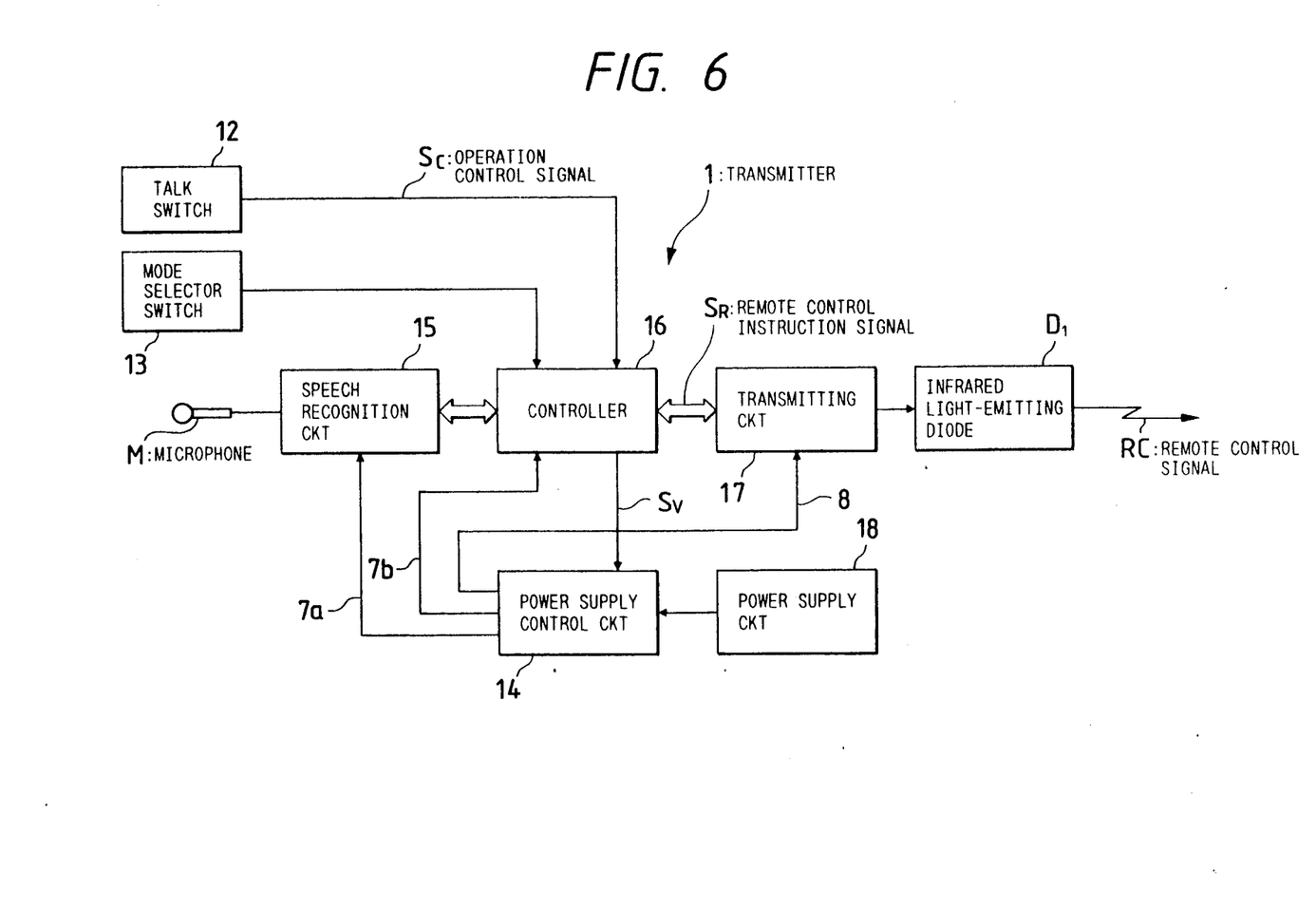
FIG. 6 is a detailed block diagram of the transmitter shown in FIG. 4.

FIG. 6 shows the electronic circuit of the transmitter 1 in greater detail. A controller 16 is connected between the speech recognition circuit 15 and the transmitting circuit 17. The talk switch 12, which is connected to the controller 16, supplies the controller 16 with an operation control signal Sc which enables the transmitter 1 to operate only when a voice command is applied. The talk switch 12 may comprise an automatic-return switch having a pushbutton, a slide switch, or the like. The power supply control circuit 14 is also connected to the controller 16 and serves as a control circuit which, responsive to a control signal Sv from the controller 16, operates the transmitter 1 in a low power consumption mode in which electric power is supplied to back up various data stored in a memory in the speech recognition circuit 15. More specifically, the power supply control circuit 14 comprises a switching circuit for selectively connecting power supply wires 7a, 7b, 8 to select the low power consumption mode. The power supply wires 7a, 7b are connected respectively to the speech recognition circuit 15 and the controller 16. The mode selecter switch 13, which is also connected to the controller 16, causes the controller 16 to control the speech recognition circuit 15 to switch between the speech recognition mode and the speech registration mode. The mode selector switch 13 applies a mode switching signal to the controller 16.

Figure 7:
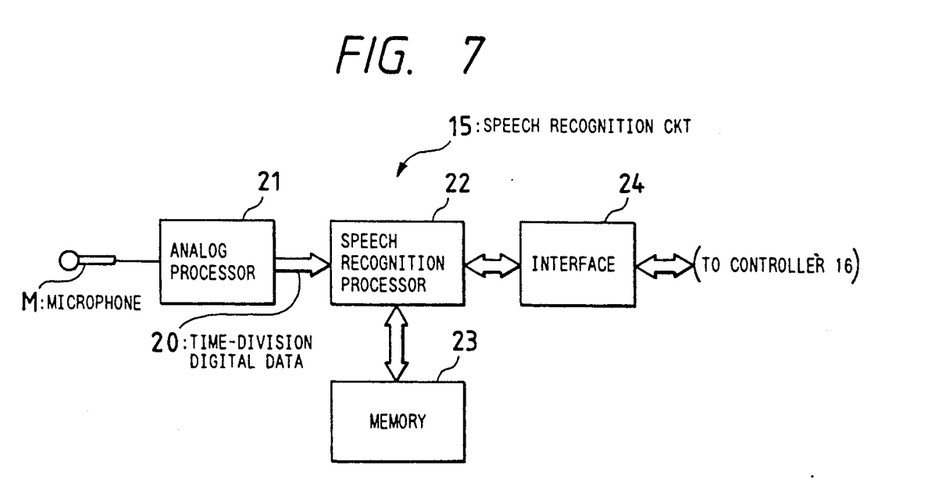
FIG. 7 is a block diagram of a speech recognition circuit according to the first embodiment.

As shown in FIG. 7, the speech recognition circuit 15 comprises an analog processor 21 for processing an analog voice command signal which is received through the microphone M and outputting the processed analog voice command signal as a time-division digital data 20, a speech recognition processor 22 for recognizing the voice command based on the time-division digital data 20 from the analog processor 21, a memory 23 for storing standard pattern data for speech recognition, and an interface 24 for transmitting signals to an receiving signals from the controller 16.

Figure 8:
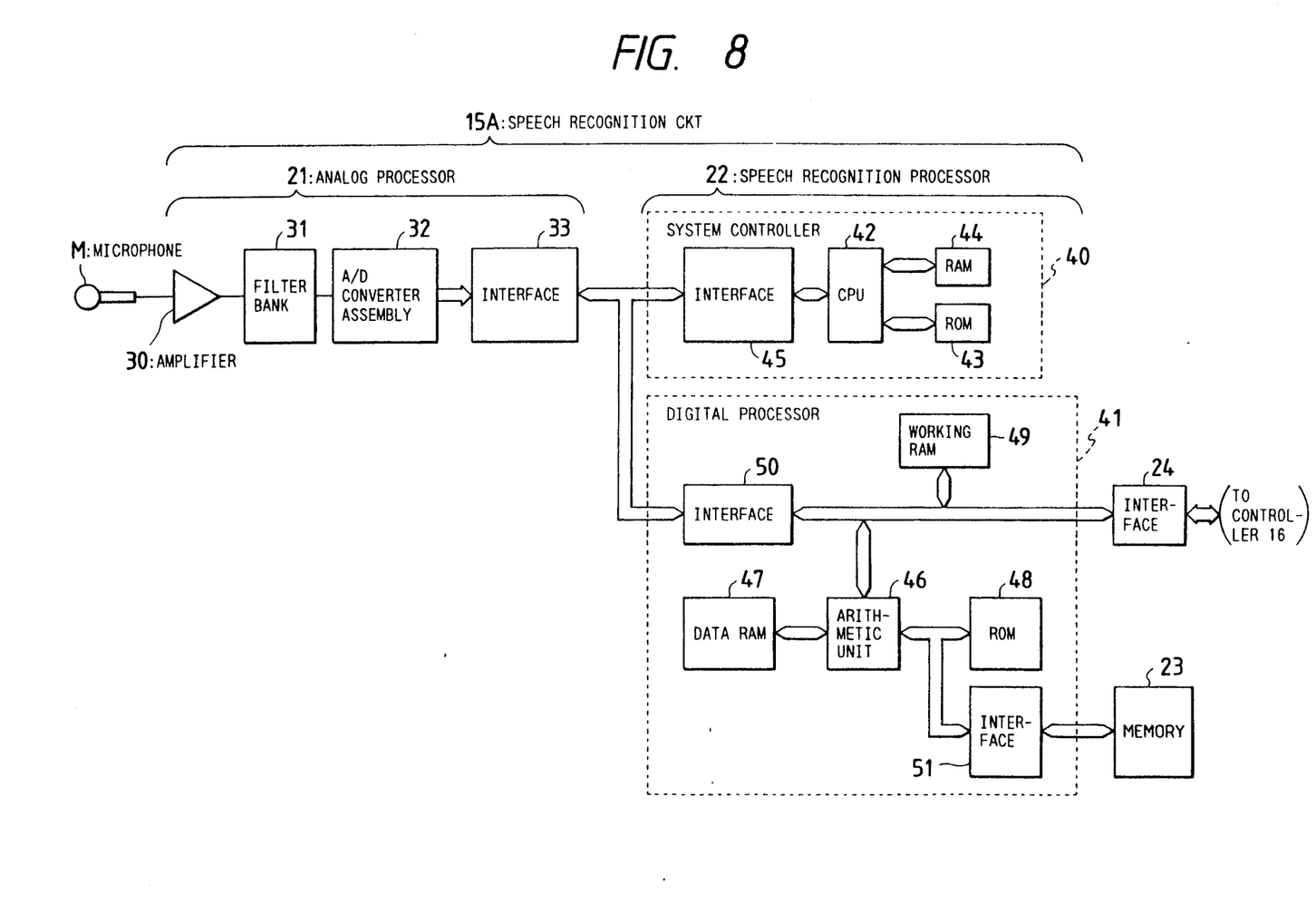
FIG. 8 is a detailed block diagram of the speech recognition circuit according to the first embodiment.

As shown in FIG. 8, the analog processor 21 command signal transmitted from the microphone M to a suitable level, a filter bank 31 for dividing an amplifier output signal into signals in different frequency bands and rectifying and outputting the signals in these different frequency bands, an analog-to-digital converter assembly (hereinafter referred to as an "A/D converter assembly") 32 for converting the output signals in the different frequency bands from the filter bank 31 into digital signals, and an interface 33 for transmitting signals to and receiving signals from the speech recognition processor 22.

Figure 9A:
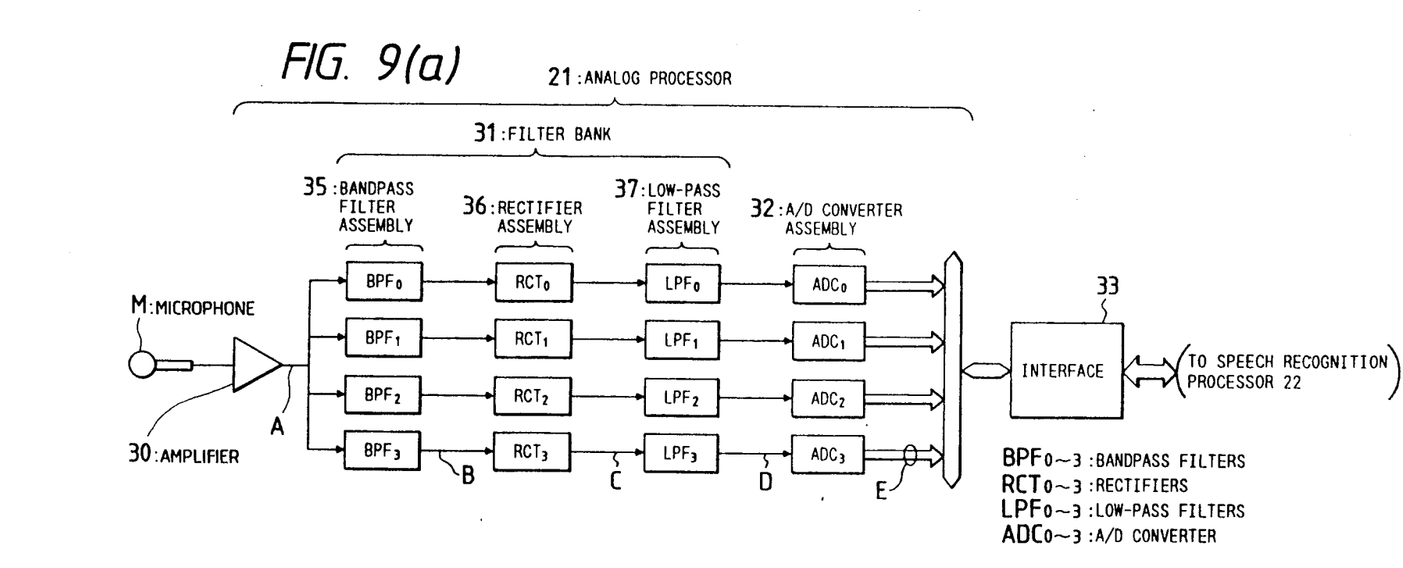
FIG. 9(a) is a diagram showing an analog processor.

As shown in FIG. 9(a), the filter bank 31 comprises a bandpass filter assembly 35 for dividing the input voice signal into signals in a plurality of frequency bands (four frequency bands in FIG. 9(a)), a rectifier assembly 36 for rectifying output signals from the bandpass filter assembly 35, and a low-pass filter assembly 37 for removing ripples from output signals from the rectifier assembly 36.

The bandpass filter assembly 35 comprises a plurality of (four in FIG. 9(a)) bandpass filters BPF0 through BPF3 which have respective central frequencies f0, f1, f2, f3 ($f0 < f1 < f2 < f3$) corresponding to the frequency bands.

The rectifier assembly 36 comprises four rectifiers RCT0 through RCT3 connected in series with the bandpass filters BPF0 through BPF3 of the bandpass filter assembly 35, respectively. The rectifiers RCT0 through RCT3 rectify the output signals from the bandpass filters BPF0 through BPF3 in the respective frequency bands.

The low-pass filter assembly comprises four low-pass filters LPF0 through LPF3 connected in series with the rectifiers RCT0 through RCT3 of the rectifier 36, respectively. The low-pass filters LPF0 through LPF3 remove ripples from the rectified signals in the respective frequency bands.

The A/D converter assembly 32 comprises four A/D converters ADC0 through ADC3 connected in series with the low-pass filters LPF0 through LPF3 of the low-pass filter assembly 37, respectively. The A/D converters ADC0 through ADC3 converter the analog output signals from the low-pass filters LPF0 through LPF3 into digital signals.

Operation of the analog processor 21 will be described below. For the sake of brevity, only signal processing in one frequency band (e.g., through the bandpass filter BPF3) will be described. However, similar signal processing is carried out in the other frequency bands.

Figures 9B, 9C:
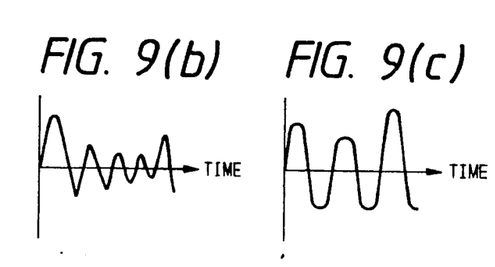
FIGS. 9(b) through 9(f) are diagrams showing the waveforms of signals in the analog processor shown in FIG. 9(a)
Figure 9D:
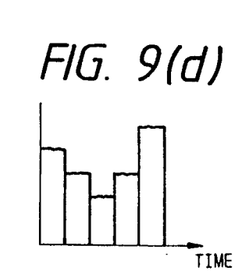
Figure 9E:
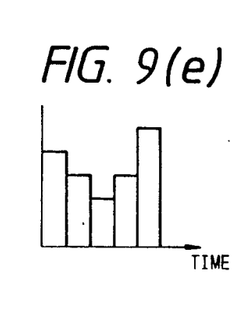
Figure 9F:
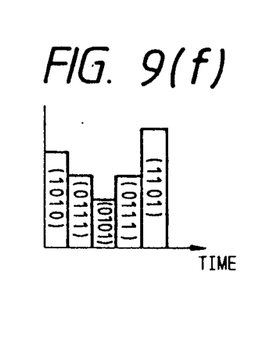

When a voice command is applied to the microphone M, the output electric signal from the microhone M is amplified to a suitable signal level by the amplifier 30, which outputs an amplified signal A (see FIG. 9(b)). The amplified signal A is applied to the bandpass filter BPF3, which then passes only a signal B in its passband. The signal B is then applied to the rectifier RCT3 (see FIG. 9(c)). The signal B is rectified by the rectifier RCT3, and a rectified output signal C (FIG. 9(d)) from the rectifier RCT3 is transmitted to the low-pass filter LPF3. The low-pass filter LPF3 removes ripples which may be contained in the signal C, and produces a ripple-free output signal D (see FIG. 9(e)) which is then inputted to the A/D converter ADC3. The A/D converter ADC3 then converts the supplied input signal D into a signal E composed of 4-bit time-division digital data (1010), (0111), (0101), (0111), (1101), . . . , as shown in FIG. 9(f).

As illustrated in FIG. 8, the speech recognition processor 22 comprises a system controller 40 for analyzing and processing control commands from the controller 16 and also for controlling the entire operation of the speech recognition processor 22, and a digital processor 41 for effecting distance calculations and controlling the memory 23.

The system controller 40 comprises a CPU (Central Processing Unit) 42 for controlling the overall operation of the transmitter 1, a ROM (Read-Only Memory) 43 for storing a control program to be executed by the CPU 42 for the overall operation of the transmitter 1, RAM (Random-Access Memory) 44 for temporarily storing data, and an interface 45 for transmitting data to and receiving data from the analog processor 21 and the digital processor 41.

The digital processor 41 comprises an arithmetic unit 46 for effecting distance calculations and identifying input voice commands based on the results of the distance calculations, a data RAM 47 for storing data necessary for distance calculations, a ROM 48 for storing a program for distance calculations, a working RAM 49 for temporarily storing processed data, an interface 50 for transmitting data to and receiving data from the analog processor 21 and the system controller 40, and an interface 51 for transmitting data to and receiving data from the memory 23.

The speech recognition processor 22 operates as follows: when a control command is applied from the controller 16 through the interface 24 to the speech recognition processor 22, the system controller 40 receives the control command through the interfaces 50, 45 and analyzes the received control command. If the result of analysis indicates a speech recognition process, the system controller 40 sends an instruction for speech recognition to the digital processor 41 through the interfaces 45, 50.

When instructed by the system controller 40, the digital processor 41 introduces time-division digital data (input voice command signal) 20 from the analog processor 21 through the interface 50 into the data RAM 47. The arithmetic unit 46 reads the first standard pattern data from the memory 23 which stores a plurality of standard pattern data, through the interface 51. Then, the arithmetic unit 46 determines the logarithm of the first time-division digital data of a plurality of time-division digital data which constitute one of the read standard pattern data and also the logarithm of the first time-division digital data of the input voice command signal, and then determines the differences between the two logarithms. The arithmetic unit 46 further squares the differences, and adds the squares to determine a distance D. Therefore, the distance D is given by:

$$D = \sum_{t=0}^{x} (\log(f(t)) - \log(fs(t)))^2$$

where x:

the number of time divisions;
f(t): the input voice command data (time-division digital data); and
fs(t): the standard pattern data (time-division digital data).

Likewise, the distances D are calculated in the same manner for all the standard pattern data. The smaller the calculated distances, the higher the probability that the standard pattern data are similar to the voice command. The recognition result thus obtained is then outputted as command data through the interface 24 to the controller 16.

Referring back to FIG. 6, the controller 16 is in the form of a microprocessor and controls the overall operation of the transmitter 1 according to a control program stored in a ROM in the controller 16. The mode and timing of operation of the controller 16 are controlled by the talk switch 12 and the mode selector switch 13. The controller 16 has the voice command detector circuit 5 according to the present invention. The voice command detector circuit 5 is implemented by a detecting program stored in the ROM in the controller 16. The detecting program has the step of determining whether the talk switch 12 is pressed or not, and is included in the control program. The detecting program is given by a step S2 shown in FIG. 10, and will be described later on.

Overall Operation

The transmitter 1 operates depending on whether the talk switch 12 is pressed or released (i.e., turned on or off). If the talk switch 12 is pressed, the transmitter 1 is capable of transmitting remote control signals, and if the talk switch 12 is released, the transmitter 1 is kept in the low power consumption mode, waiting for voice commands to be applied. There are two input modes for entering voice commands. In one input mode, voice commands of the operator are registered, and in the other input mode, voice commands of the operator are recognized. In the voice registration mode, a command word such as "reproduction" is recorded in the transmitter 1.

Figure 10:
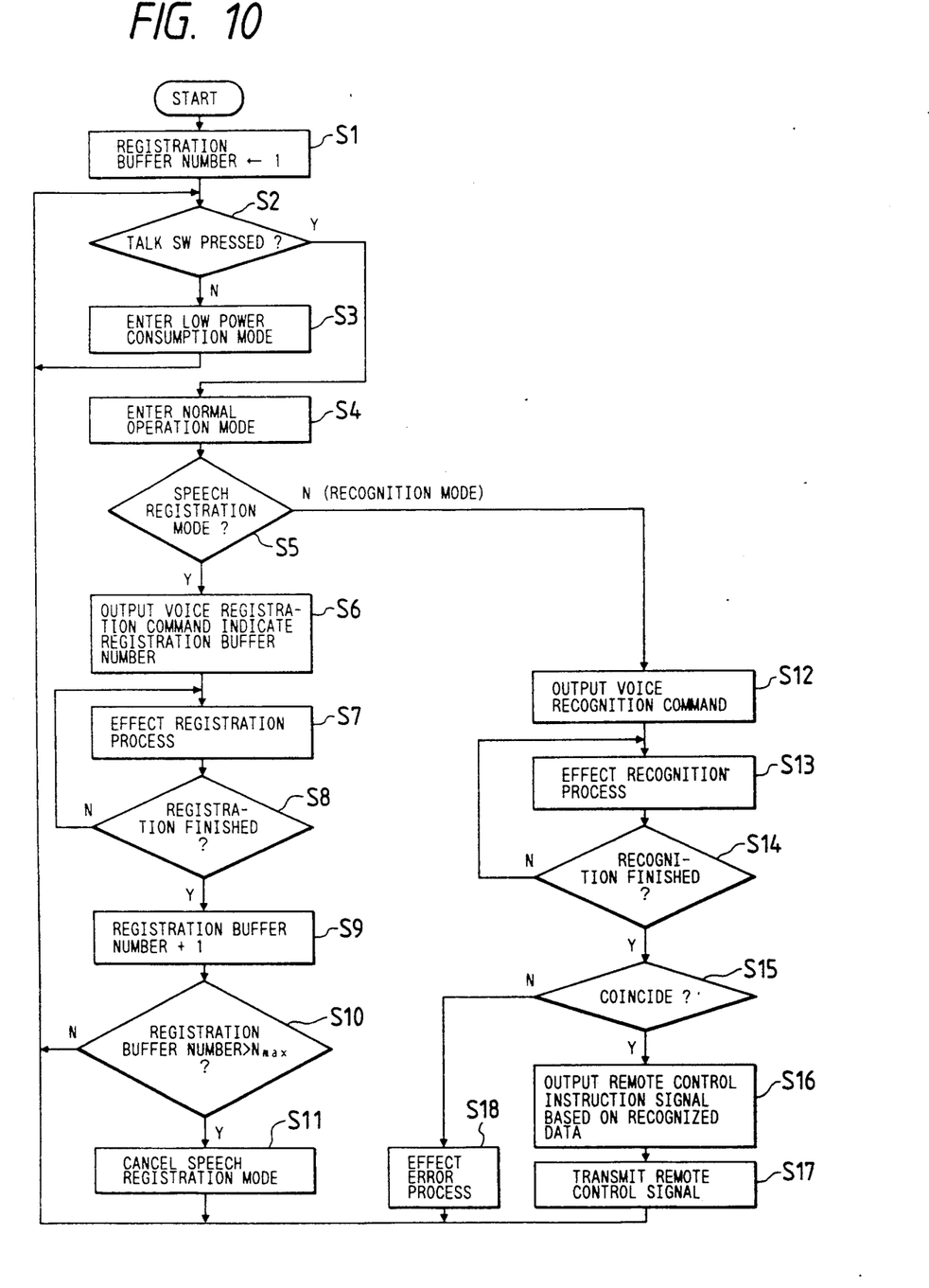
FIG. 10 is a flowchart of an operation sequence of the transmitter according to the first embodiment.

Now, operation of the transmitter 1 will be described below with reference to the flowchart of FIG. 10. It is assumed that the talk switch 12 is not pressed and the transmitter 1 is in a standby condition in the low power consumption mode.

First, the controller 16 initializes a registration buffer number to 1 in a step S1.

Then, the controller 16 detects whether the talk switch 12 is pressed or not in a step S2 by detecting whether there is produced an operation control signal Sc from the talk switch 12 or not. If an operation control signal Sc is produced at this time, then it means that the talk switch 12 is pressed, and the controller 16 sends a control signal Sv to the power supply control circuit 14. The power supply control circuit 14 supplies electric energy in a normal mode enabling the transmitter 1 in a step S4.

If the talk switch 12 is not pressed, the transmitter 1 is left in the low power consumption mode, and the steps S2 and S3 are repeated.

Thereafter, the controller 16 reads the condition of the mode selector switch 13 to determine whether it indicates the speech registration mode for voice commands or not in a step S5.

If the speech registration mode is indicated, control then goes to a step S6 in which the controller 16 outputs a command to instruct the speech recognition circuit 15 to carry out a speech registration process. At the same time, the controller 16 sends a registration buffer number to the speech recognition circuit 15 in the step S6.

The speech recognition circuit 15 then stores speech recognition standard pattern data in a corresponding registration buffer in the memory 23, i.e., a registration buffer having the registration buffer number=1, in a step S7.

The controller 16 reads a status register (not shown) in the speed recognition circuit 15 to determine whether the registration of a voice command is finished or not in a step S8. If the registration is not yet finished, then the steps S7 and S8 are repeated until the registration is finished. If the registration is finished, the registration buffer number is incremented by 1 in a step S9.

Then, the controller 18 determines whether the current registration buffer number has exceeded a maximum number Nmax that can be registered or not in a step S10. If not, then control returns to the step S2. If exceeded, the controller 16 sends a command to cancel the speech registration mode to the speech recognition circuit 15, thereby cancelling the speech registration mode in a step S11. Then, control goes back to the step S2.

If the speech registration mode is not indicated by the mode selector switch 13 in the step S5, i.e., if the speech recognition mode is indicated by the mode selector switch 13 in the step S5, then the controller 16 outputs a speech recognition command to the speech recognition circuit 15 in a step S12. The speech recognition circuit 15 now effects a speech recognition process as described above in a step S13.

The controller 16 reads a status register (not shown) in the speech recognition circuit 15 to determine whether the speech recognition is finished or not in a step S14. If the speech recognition is not yet finished, then the steps S13 and S14 are repeated until the speech recognition is finished. If the speech recognition is finished, then the controller 16 determines whether the input voice command data and the standard pattern data coincide with each other, i.e., the distance D falls within a predetermined distance, or not in a step S15. If the input voice command data and the standard pattern coincide with each other, the controller 16 produces a remote control instruction signal SR based on the recognized voice command data and sends the remote control instruction signal SR to the transmitting circuit 17 in a step S16. In response to the remote control instruction signal SR, the transmitting circuit 17 transmits a corresponding remote control signal RC in a step S17. If the input voice command data and the standard pattern data do not coincide with each other in the step S15, then the controller 16 effects an error process such as the generation of a buzzer sound in a step S18, and control goes back to the step S2.

Since the transmitter 10 remains in the low power consumption mode and hence in the standby condition unless the talk switch 12 is pressed, as described above, the speech recognition circuit 15 is not energized and no speech recognition process is carried out. As a result, insofar as the talk switch 12 is not pressed, the transmitter 10 is prevented from being triggered into an erroneous operation, and the electric power consumption is reduced.

In the above embodiment, the transmitter 10 does not have a key switch assembly for entering remote control commands. However, if the transmitter 10 has such a key switch assembly as with a conventional key-operated remote control unit or has key switches for performing minimum functions, the transmitter 10 can reliably remote control the controlled device through such key switches even when the speech recognition circuit fails to operate properly with voice commands due to a drop in the power supply voltage. Use of key switches with the transmitter 10 also falls within the scope of the present invention.

Second Embodiment

A voice-operated remote control system according to a second embodiment of the present invention will be described below with reference to FIGS. 11 through 13.

External Structure

The transmitter of the voice-operated remote control system according to the second embodiment may have the same external structure as that of the transmitter 1 shown in FIG. 4. Therefore, the description of the external structure of the transmitter 1 with reference to FIG. 4 applies to the transmitter according to the second embodiment.

Electronic Circuit Structure

Figure 11:
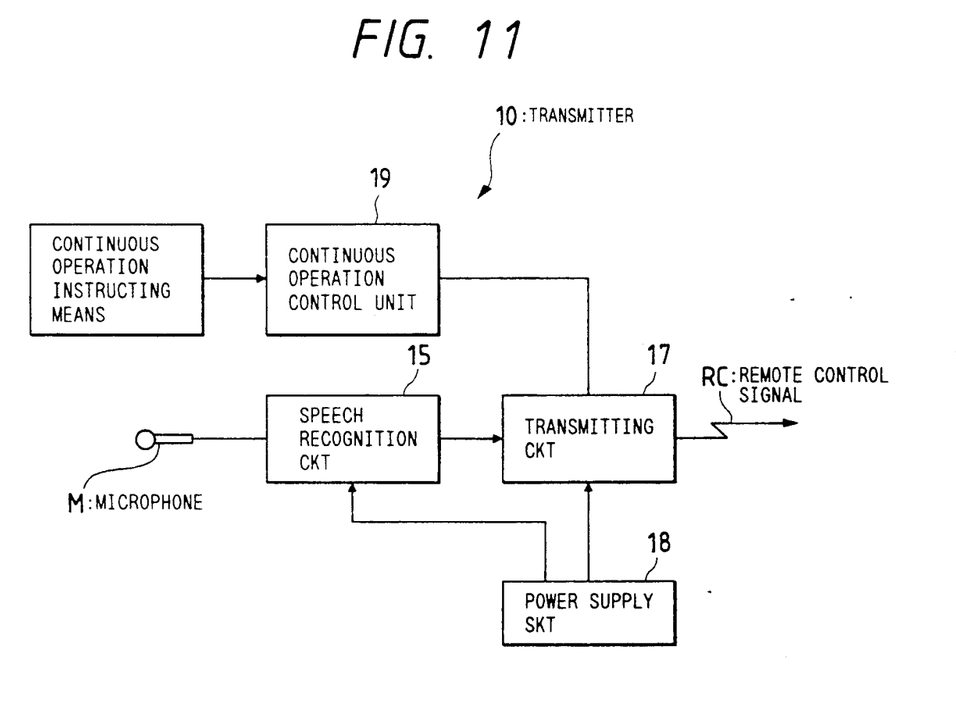
FIG. 11 is a block diagram of a transmitter of a voice-operated remote control system according to a second embodiment of the present invention.

FIG. 11 shows in block form the electronic circuit of the transmitter 10 of the voice-operated remote control system according to the second embodiment of the present invention. The transmitter 10 has a microphone M for converting a voice command into an electric signal, a speech recognition circuit 15 for recognizing the voice command based on the electric signal from the microphone M and producing command data corresponding to the voice command, a transmitting circuit 17 for generating and transmitting a remote control signal RC based on the command data, and a power supply circuit 18 for supplying electric energy to the various components of the transmitter 10. The transmitter 10 also has a continuous operation instructing means for outputting an instruction signal to instruct a controlled device to repeat one operation, and a continuous operation control unit 19 for adding an operation repeat command to the remote control signal RC based on the instruction signal.

Figure 12:
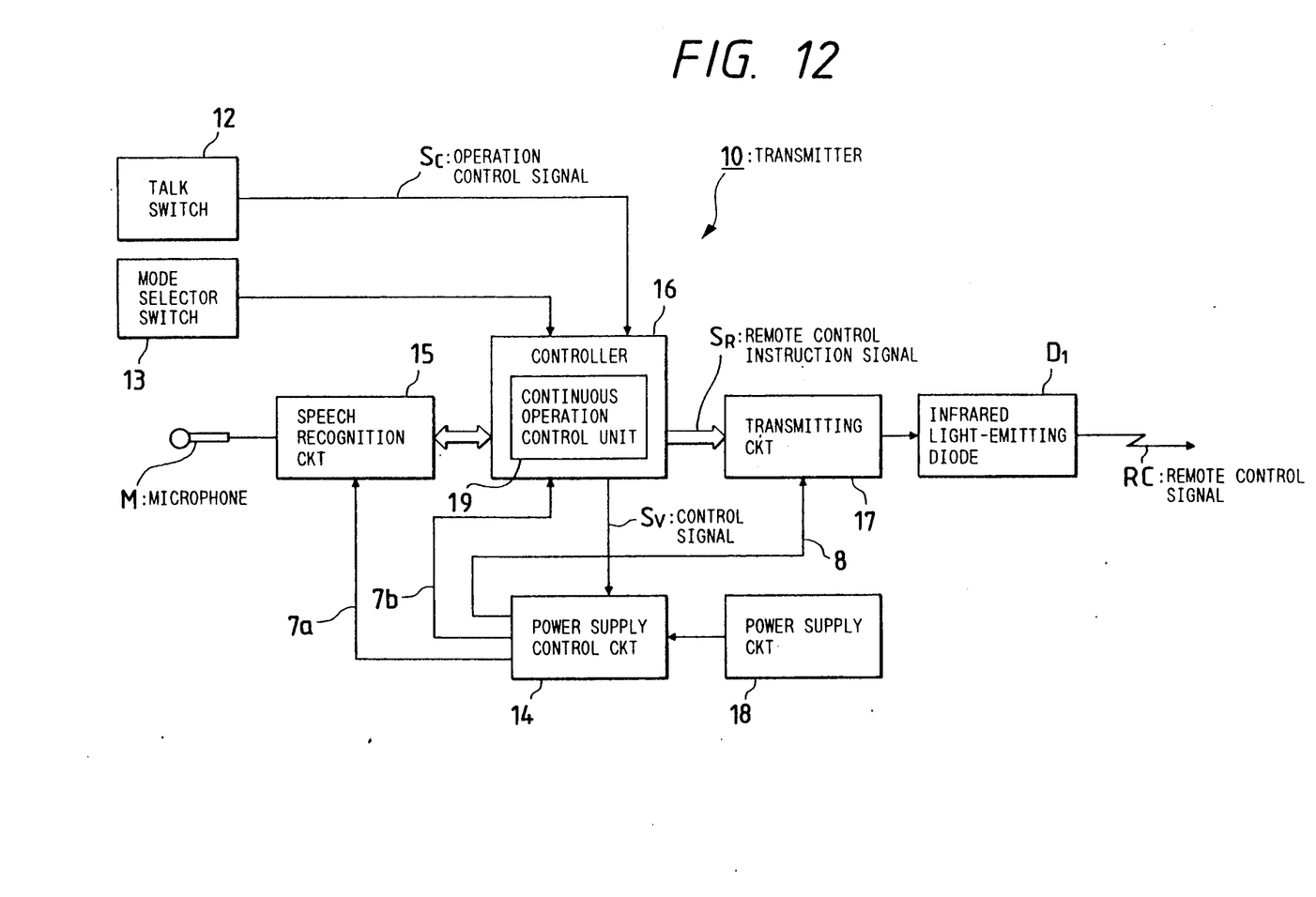
FIG. 12 is a block diagram of the voice-operated remote control system according to the second embodiment.
Figure 13:
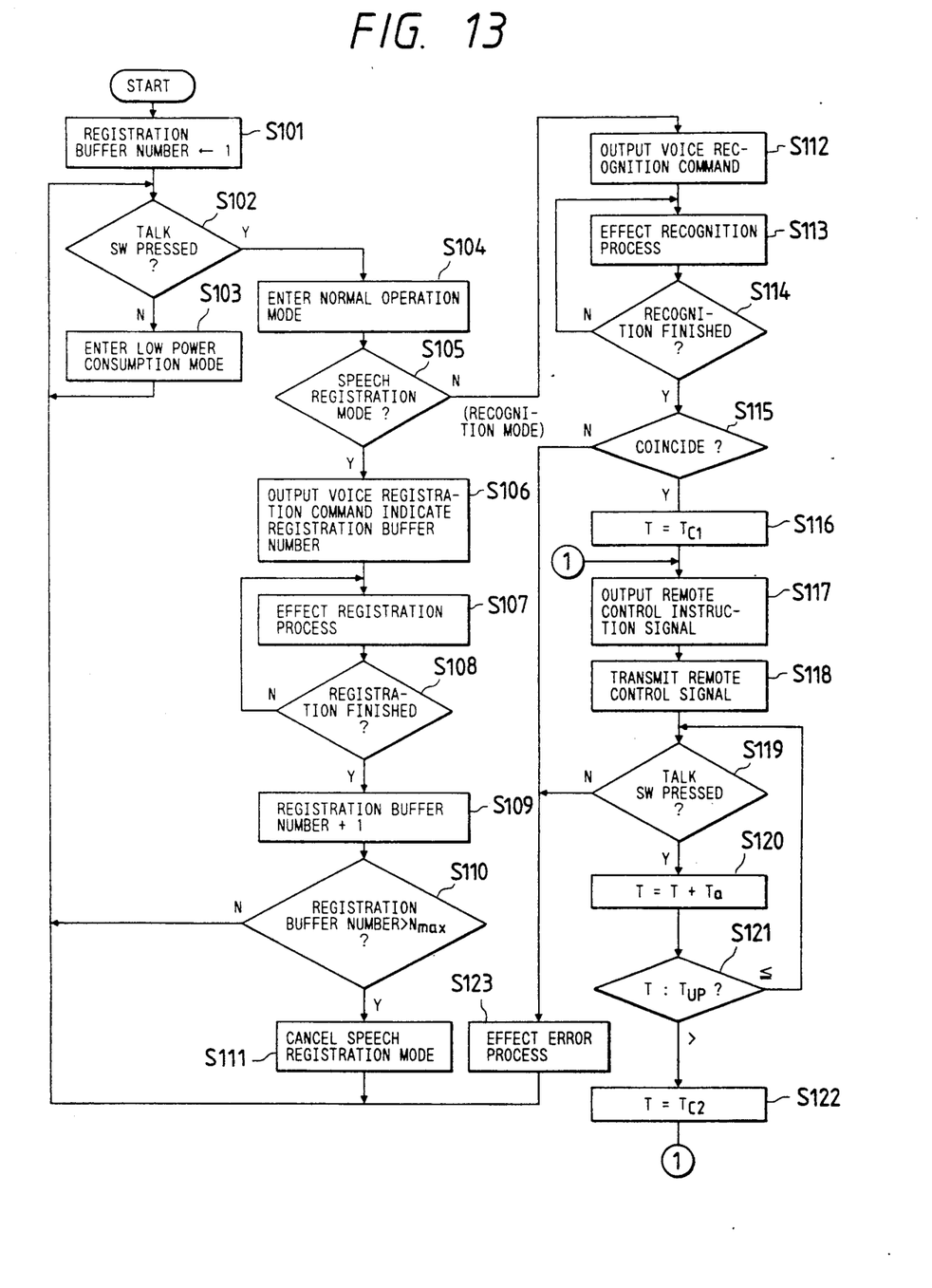
FIG. 13 is a flowchart of an operation sequence of the transmitter according to the second embodiment.

The transmitter 10 is shown in detail in FIG. 12. The transmitter 10 differs from the transmitter 1 shown in FIG. 6 mainly in that the transmitter 10 additionally has the continuous operation control unit 19.

The continuous operation control unit 19 may be hardware-implemented by an independent electronic circuit. In the illustrated embodiment, however, the continuous operation control unit 19 is software-implemented by a control operation of the controller 16 based on a control program stored in the ROM in the controller 16. The continuous operation control unit 19 serves to enable the controller 16 to output a remote control instruction signal SR which causes the controlled device to repeat a desired operation, in response to an operation control signal Sc from the talk switch 12.

The other structural details of the transmitter 10 are the same as those of the transmitter 1 shown in FIGS. 6 through 9. For example, the transmitter 10 shown in FIG. 12 has a microphone M, a speech recognition circuit 15, a transmitting circuit 17, a power supply control circuit 14, a power supply 18, a talk switch 12, a mode selector switch 13, and an infrared light-emitting diode D1, which are identical to those shown in FIGS. 6 through 9. Therefore, these components will not be described in detail below.

Overall Operation

Now, operation of the transmitter 10 will be described below with reference to the flowchart of FIG. 13. It is assumed that the talk switch 12 is not pressed and the transmitter 10 is in the low power consumption mode.

First, the controller 16 initializes a registration buffer number to 1 in a step S101.

Then, the controller 16 detects whether the talk switch 12 is pressed or not in a step S102 by detecting whether there is produced an operation control signal Sc from the talk switch 12 or not. If an operation control switch Sc is produced at this time, then it means that the talk switch 12 is pressed, and the controller 16 sends a control signal Sv to the power supply control circuit 14. The power supply control circuit 14 supplies electric energy in a normal mode, enabling the transmitter 10 in a step S104.

If the talk switch 12 is not pressed, the transmitter 10 is left in the low power consumption mode, and the steps S102 and S103 are repeated.

Thereafter, the controller 16 reads the condition of the mode selector switch 13 to determine whether it indicates the voice registration mode or not in a step S105.

If the voice registration mode is indicated, control then goes to a step S106 in which the controller 16 outputs a command to instruct the speech recognition circuit 15 to carry out a voice registration process. At the same time, the controller 16 sends a registration buffer number to the speech recognition circuit 15 in the step S106.

The speech recognition circuit 15 then stores speech recognition standard pattern data in a corresponding registration buffer in the memory 23, i.e., a registration buffer having the registration buffer number=1, in a step S107.

The controller 16 reads a status register (not shown) in the speech recognition circuit 15 to determine whether the registration of the speech recognition standard pattern data is finished or not in a step S108. If the registration is not yet finished, then the steps S107 and S108 are repeated. If the registration is finished, the registration buffer number is incremented by 1 in a step S109.

Then, the controller 16 determines whether the current registration buffer number has exceeded a maximum number Nmax that can be registered or not in a step S110. If not, then control returns to the step S102. If exceeded, the controller 16 sends a command to cancel the voice registration mode to the speech recognition circuit 15, thereby cancelling the voice registration mode in a step S111. Then, control goes back to the step S102.

If the voice registration mode is not indicated by the mode selector switch 13 in the step S105, i.e., if the voice recognition mode is indicated by the mode selector switch 13 in the step S105, then the controller 16 outputs a speech recognition command to the speech recognition circuit 15 in a step S112. The speech recognition circuit 15 now effects a speech recognition process as described above in a step S113.

The controller 16 reads a status register (not shown) in the speech recognition circuit 15 to determine whether the speech recognition is finished or not in a step S114. If the speech recognition is not yet finished, then the steps S113 and S114 are repeated. If the speech recognition is finished, then the controller 16 determines whether the input voice command data and the standard pattern data coincide with each other, i.e., the distance D falls within a predetermined distance, or not in a step S115. If the input voice command data and the standard pattern data coincide with each other, the controller 16 sets a timer counter T to a first initial count Tc1 in a step S116, and then produces a remote control instruction signal SR based on the recognized voice command data and sends the remote control instruction signal SR to the transmitting circuit 4 in a step S117. In response to the remote control instruction signal SR, the transmitting circuit 17 transmits a corresponding remote control signal RC in a step S118. Then, the controller 16 detects whether the talk switch 12 is pressed or not in a step S119 by detecting whether there is produced an operation control signal Sc from the talk switch 12 or not. If an operation control switch Sc is produced at this time, then since the talk switch 12 is pressed, the controller 12 increments the timer counter T by a timer counter increment Ta (e.g., Ta=0.01 (sec)) in a step S120. The controller 16 compares the count of the timer counter T with a count-up value Tup (e.g., Tup=0.5 (sec)) in a step S121. If the count of the timer counter T is smaller than the count-up value Tup, then the steps 119 through 121 are repeated. If the count of the timer counter T is larger than the count-up value Tup, then the controller 16 sets the timer counter T to a second initial count Tc2 (e.g., Tc2=0.3 (sec)) in a step S122. Then, control goes back to the step S117, so that a remote control instruction signal SR is issued again. The transmitting circuit 17 therefore produces a remote control signal RC. The above cycle is repeated until the talk switch 12 is released. When the talk switch 12 is released, control goes back to the step S102. In this embodiment, therefore, 0.5 second elapses after a first remote control signal is issued in response to the entry of a voice command until a second remote control signal is transmitted, and third and following remote control signals for the same operation are issued at intervals of 0.2 second. The second and following remote control signals may be the same as the first remote control signal, or may be remote control signals for instructing the same operation.

If the input voice command data and the standard pattern data do not coincide with each other in the step S115, then the controller 16 effects an error process such as the generation of a buzzer sound in a step S123, and control goes back to the step S102.

As described above, as long as the talk switch 12 is continuously pressed, the continuous operation control unit 19 of the transmitter 10 instructs the controller 16 to produce a remote control signal RC to cause the controlled device to effect the same operation continuously. Therefore, the voice-operated remote control system can automatically instruct a continuous operation without the need for the continued entry of voice commands for such a continuous operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A voice-operated remote control system including a transmitter comprising:
   a switch disposed in one of an activated state and a deactivated state such that placing said switch in said activated state enables said transmitter and placing said switch in said deactivated state disables said transmitter;
   a microphone for converting a voice command into an electric signal;
   a first circuit for recognizing the voice command based on the electric signal from said microphone and producing command data corresponding to the voice command;
   a transmitter for generating and transmitting a remote control signal corresponding to said command data;
   a second circuit, responsive to said switch, for producing an instruction signal when said switch remains in said activated state for a predetermined time period to apply a repetition command to repeat an operation to a remotely controlled device; and
   a third circuit for adding said repetition command to said remote control signal in response to said instruction signal.

2. A voice-operated remote control system according to claim 1, further comprising:
   power supply circuit for supplying electric energy to said speech recognition means and said transmitting means;
   a fourth circuit for producing a detected signal indicative of whether a voice command is received or not; and
   power supply control circuit for cutting off the electric energy from said power supply circuit to at least said speech recognition means in the absence of a voice command as indicated by said detected signal.

3. A voice-operated remote control system according to claim 1, further comprising a casing which houses therein said switch, said microphone, said first, second, and third circuits, said transmitter, and said power supply circuit.

4. A voice-operated remote control system according to claim 3, wherein said casing houses therein a talk switch for instructing the start and end of a process which are indicated by a voice command received by said microphone.

5. A voice-operated remote control system according to claim 4, wherein said talk switch produces a signal to allow a process which is indicated by a voice command received by said microphone to be carried out only when the talk switch is pressed.

6. A voice-operated remote control system according to claim 4, wherein said second circuit comprises said talk switch, and produces said instruction signal when the talk switch is continuously pressed.

* * * * *